Jan. 23, 1951 T. C. SMITH 2,539,281
SIGNAL DEVICE FOR THE FILL LINES OF LIQUID TANKS
Filed Oct. 14, 1947 2 Sheets-Sheet 1
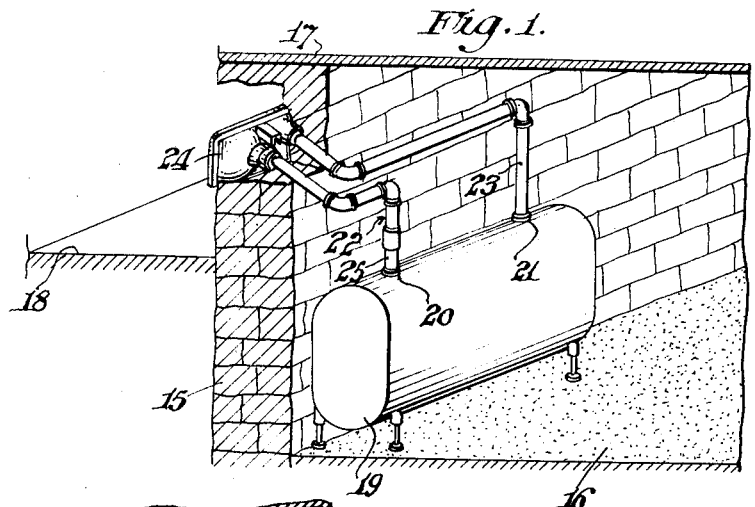
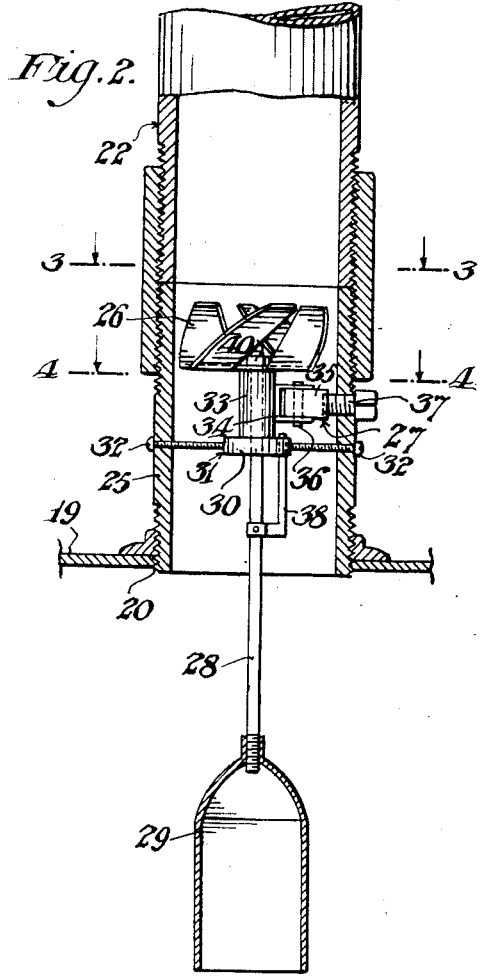
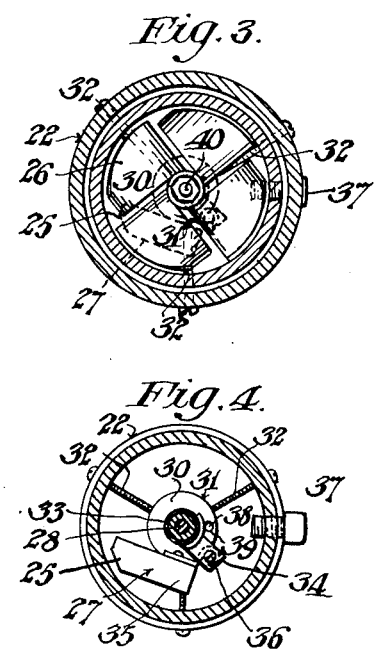
Inventor
Theodore C. Smith,
By W. W. Williamson,
Attorney.

Jan. 23, 1951 — T. C. SMITH — 2,539,281
SIGNAL DEVICE FOR THE FILL LINES OF LIQUID TANKS
Filed Oct. 14, 1947 — 2 Sheets-Sheet 2
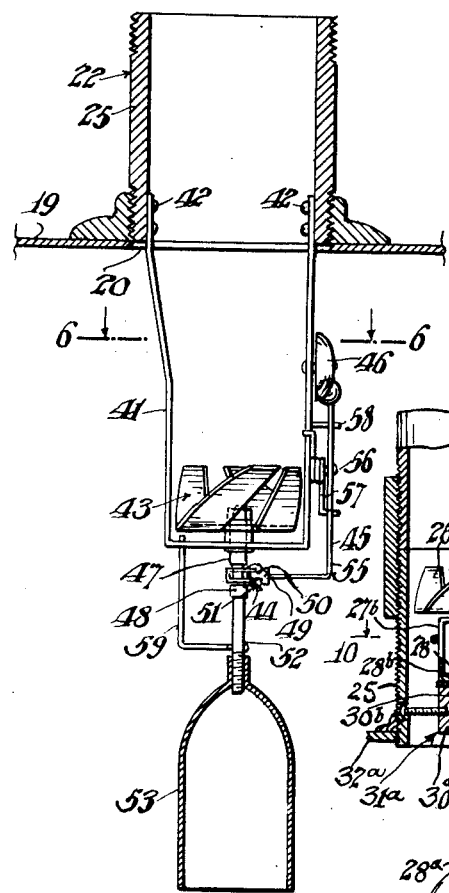
Inventor
Theodore C. Smith,
By W. W. Williamson
Attorney.

Patented Jan. 23, 1951

2,539,281

UNITED STATES PATENT OFFICE 2,539,281

SIGNAL DEVICE FOR THE FILL LINES OF LIQUID TANKS

Theodore C. Smith, Drexel Hill, Pa.

Application October 14, 1947, Serial No. 779,809

6 Claims. (Cl. 116—112)

My invention relates to new and useful signal devices for the fill lines of liquid tanks, and especially used in connection with containers generally known as closed tanks and often employed for holding oil to be fed to oil burners, gasoline or as reservoirs for other liquids, and has for one of its objects to provide means operated by the actual flow of the liquid to produce a signal and indicate a liquid level in the tank.

A tank of the character mentioned is often located a considerable distance from the ends of either or both the fill and vent lines or pipes where said ends communicate with the atmosphere and it is important that the operator be cognizant of the general conditions prevailing within the tank, such as, for example, whether the liquid level is at or below a predetermined high line when he begins to feed liquid to the tank and when the liquid has reached said predetermined high line. Therefore, another object of the present invention is to provide a form of signalling device located in the line of flow of liquid towards or entering the tank which will function continuously during the filling operations and become ineffective when the liquid level reaches said predetermined high line.

Another object of this invention is to provide an audible signal for a tank which is operated by the flow of liquid to said tank.

Another object of the invention is to provide an audible signal for a tank of the class mentioned which is actuated continuously by the flow of liquid to said tank until the liquid level has reached a predetermined high line and which will then become ineffective or cease to sound any signal thereby indicating the liquid level within the tank.

Another object of the invention is to provide an audible signal in the line of liquid flow to a tank, the sound waves being transmitted to the vicinity of the inlet end of a fill line or pipe at least by vibrations set up in said fill line or pipe.

Another object of the invention is to provide a signal actuated by the flowing liquid as it is fed to a tank, which will not interfere with either the fill or vent lines and therefore is absolutely safe at all times.

Another object of the invention is to provide a signal of the kind mentioned connected with the fill line and located in said fill line or adjacent the outlet end thereof whereby sounds produced by or through the medium of a striker will be transmitted by the fill pipe or the tank and said fill pipe or through said fill pipe or a vent pipe.

Another object of the invention is to provide, in combination, a fill-vent box having sockets to receive the ends of fill and vent lines or pipes, a tank to and from which lead the vent and fill lines, respectively, and an audible signal connected with the fill line to produce sounds that may be transmitted, in particular, along the fill line by vibrations.

A further object of this invention is to provide a signal for fuel tanks including a striker to directly or indirectly produce sounds upon the fill line leading to the tank.

A still further object of this invention is to provide an audible signal for a liquid tank, said signal including an operating element and an operated element, said signal to be actuated by liquid flowing to the tank and having an additional means controlled by the rising liquid level to cause the operated element to become temporarily ineffective while permitting the operating element to continue certain of its functions.

With the above and other objects in view this invention consists of the details of construction and combination of elements hereinafter set forth and then designated by the claims.

In order that those skilled in the art to which this invention appertains may understand how to make and use the same I will describe its construction in detail, referring by numerals to the accompanying drawings forming a part hereof, in which—

Fig. 1 is a perspective view of a fuel tank located in the basement of a building and illustrating a fill-vent box in a wall with the fill and vent lines or pipes connected to said box and tank, and said fill line constructed or assembled to contain or support any one of the types of audible alarm mentioned herein.

Fig. 2 is an enlarged fragmentary sectional elevation of the tank, fill line, and one form or type of the alarm.

Fig. 3 is a cross sectional view on the line 3—3 of Fig. 2.

Fig. 4 is a similar view on the line 4—4 of Fig. 2.

Fig. 5 is a view, partly in section and partly in elevation, of another form of signal.

Fig. 6 is a section on the line 6—6 of Fig. 5 looking in the direction of the arrows.

Fig. 7 is an enlarged fragmentary sectional elevation of Fig. 5.

Fig. 8 is a view, partly in section and partly in elevation of still another form of the signal.

Fig. 9 is a view also partly in section and partly in elevation of another of the signal.

Fig. 10 is a section on the line 10—10 of Fig. 9.

In carrying out my invention as herein embodied there is shown in Fig. 1, merely for purposes of illustration, a part of a basement of a building, having an outer wall 15, with a floor 16 and a ceiling 17, and outside thereof is the grade level 18 of the ground or pavement surface. Also, for purposes of illustration only, there is depicted a fluid tank 19 standing upon the floor 16 and said tank has, at least, two openings 20 and 21 herein termed the filling and vent openings, respectively. A fill pipe or line 22 communicates with the tank through the opening 20 and similarly a vent line or pipe 23 communicates with the tank through the opening 21.

Both the fill line and the vent line are illustrated as connected with a fill-vent box 24 of suitable construction which is shown as mounted in the wall 15 but can be located in any desirable position. While the fill and vent lines are disclosed as connected with the fill-vent box, which is an advantageous installation, other arrangements of the lines can be employed. For example, the inlet end of the fill line and outlet end of the vent line can be located in separate boxes, one in a box and the other projecting into the open, or both projecting into the open, and said ends can be located adjacent one another or any distance apart within reason. The fill line or pipe 22 includes, for purpose of convenient assembly and manufacture, a nipple 25 threaded at both ends so it may be screwed into the fill opening 20 in the tank and also connected with the balance of the fill line or pipe.

Referring especially to Figs. 2 to 4, inclusive, I have illustrated one form of the invention wherein an operating member or impeller 26 and an operated member or striker 27 are connected with one another whereby they function as a unit and are revolvably mounted on a rod 28 which acts as a shaft and also as a stem for the float 29. The rod 28 is slidably mounted in the bearing portion 30 of the support 31 which is depicted as a spider including legs 32 supported by the fill line, in general, and the nipple 25 in particular. Said legs can be screws, threaded through the wall of the nipple and into the bearing portion 30.

While it is not to be considered as limited to the form shown, the structure of the movable parts of the signal may include a sleeve 33 which is revolvably and slidably connected with the rod shaft 28 and this sleeve normally rests on the bearing portion 30 of the support 31. The operating member or impeller 26 is fixed to any appropriate part of the sleeve 33, preferably the upper end thereof, in any suitable manner. The operated member or striker 27 is also fixedly connected to said sleeve 33 whereby the impeller, sleeve and striker can revolve as a unitary mechanism about the rod shaft 28. The operated member or striker 27 herein shown comprises a bifurcated bracket 34 fixed directly to the sleeve and a swinging hammer 35 pivoted at 36 to said bracket 34. This arrangement of parts permits the hammer element of the striker to be swung or forced inwardly by some outside device and to swing outwardly due to centrifugal force.

Within the fill line, and especially the nipple 25, in the path of travel of the striker, particularly the hammer portion 35 is projected or swung outward, is located a lug 37 which is carried directly by the fill line, or the nipple 25 thereof, whereby it is, positively or in effect, an integral part of said fill line. In order that said lug may be replaced, when worn, and for convenience of manufacture it is shown as a bolt or screw threaded through the wall of the nipple in a radial direction.

In operation, as liquid flows through the fill line 22 such liquid will cause the operating member or impeller 26 to revolve and transmit motion to the striker 27 causing the latter to hit the lug 37 each time contact is made, thus producing sounds that will be transmitted along said fill line due to vibrations therein, or travel through either said fill or vent lines. These sounds are readily audible to an operator standing in the vicinity of the exposed ends of the lines and especially the inlet end of the fill line. The sounds will continue as long as liquid is flowing through the fill line or until the striker ceases to be effective, as when the liquid reaches a predetermined height within the tank, at which time the sounds will discontinue, thus indicating the liquid level. This condition actually can be brought about by the oil level reaching the location of the impeller but since the position for the impeller seems to be above and outside of the tank and directly within the fill line it is preferable to use the float structure for stopping the sounds. To this end an arm 38 is fixed to the rod 28 any suitable distance below the support 31 and extends upwardly in parallel spaced relation to said rod 28 to be projected into the path of travel of the striker 27 as the float rises. Of course the rod 28 should not revolve when the arm 38 is engaged by the striker and this can be accomplished by passing the arm through some stationary element. For this purpose the arm 38 is shown extending into and/or through a hole 39, Fig. 4, in the bearing portion 30 of the support 31. When the sound producing mechanism is in operative condition the float is in its lowered position and the extent of its descent is controlled by the head 40, shown as a nut, on the rod 28 engaging a stop which may be the hub of the impeller 26.

The form of signal shown in Figs. 5, 6 and 7 includes a support 41 in the form of a hanger produced from a strip of metal bent generally U-shaped and having the ends secured to the fill line 22, and especially the nipple 25, at 42. The lower portion of the support hanger is restricted or one side inset a distance equal to the space occupied by other elements on the outside of said support hanger, said elements to be referred to below, so that said hanger and component parts can be inserted through the fill opening 20.

On the support hanger 41 is revolvably mounted an operating member or impeller 43 and an operated member or striker 44 which function as a unit to actuate the clapper 45 of a bell 46. In particular, a tubular bearing 47 is mounted in the support hanger for strengthening purposes and may be fixed in position by providing a rib on said bearing to engage one face of the hanger and then turn over the edge of the end of the bearing on the opposite face of said hanger. In the bearing is revolvably mounted the sleeve 48 to the upper end of which is fixed the aforementioned operating member or impeller 43 and the bifurcated bracket 49 of the striker is also fixed to said sleeve 48. In addition to the bracket 49, said striker includes a swinging hammer 50 pivoted at 51 to said bracket 49.

A rod which is slidably mounted in the sleeve 48 and acts as a shaft for said sleeve as well as a stem for the float 53. The descent of the rod 52, and component fittings, is limited by a head 54 on the upper end of said rod which head is shown as a nut screwed onto the end of the rod and engaging a stop which may be the hub of the impeller 43.

The bell clapper 45 may include as a part thereof a substantially right angle extension 55 in the path of travel of the striker as the hammer portion 50 is projected by centrifugal force and this will actuate the clapper each time the striker passes to cause it to hit the bell 43 and make a series of sounds which will be transmitted along the fill line or through said fill and/or vent lines. Each time the striker hits the bell clapper the hammer portion will recede or retract to permit passage of the striker past the bell clapper, which is pivoted on a pivoting means 56 carried by the hanger support. Immediately the clapper will be returned to its neutral or rest position, out of contact with the bell or other sound producing device mounted on the support hanger, by a spring 57, or equivalent thereof, which urges the clapper towards and to its neutral or at rest position determined by a stop 58 projecting from the support hanger.

As previously stated the rise of the liquid level in the tank may stop the operations of the signal by the liquid reaching the impeller, especially since it and all of the operating parts are within the tank, but it can be stopped by other means. With this in mind an arm 59 is fixed to the rod 52 any suitable distance below the sleeve 48 and extends upwardly in parallel spaced relation to said rod a distance sufficient to permit the striker to revolve without interference. This arm 59 extends upwardly through a hole 60 in the support hanger and is adapted to be projected into the path of travel of the operating member or impeller during the rise of the float to stop said impeller and other associated parts. especially the striker, thereby causing the signal sounds to cease and indicating that the liquid level has reached a predetermined high point.

From the foregoing it will be apparent that one side or leg of the support hanger is bent inwardly a distance approximately equal to the space occupied by the bell, clapper and associated parts on the outside of the support hanger. This restriction of the lower part of the support hanger permits the apparatus to be inserted through the fill opening 20 in the tank.

The type of signal shown in Fig. 8 is similar to that illustrated in Figs. 5, 6 and 7, and includes the support 41a in the form of a hanger fashioned from a strip of metal bent to general U-shape configuration and fastened at 42a to the fill line 22 and the nipple 25 in particular. The lower portion of the support hanger is restricted in the same manner and for the same purpose as the first described support hanger.

In this case the operating member or impeller 43a is fixed to the upper end of a rod or shaft 61 that is journalled in the support hanger to freely revolve and a bearing 47a may be provided for this purpose. On the lower part of the rod or shaft 61 is fixed a rigid striker 62 and in the path of travel of said striker is a bell clapper 45a mounted on a pivot 56a carried by the support hanger and said clapper is so fashioned and positioned that when the striker hits the clapper the latter will be moved against the bell 46a and at the same time a portion of said clapper will be elevated sufficiently to permit the striker to ride underneath the clapper and free the latter for return to a neutral position.

The bell also is mounted on the hanger and the clapper is disengaged therefrom by the spring 57a and returned to the neutral or rest position which is determined by the stop 58a projecting from the support hanger.

As liquid flows from the fill line into the tank said liquid runs onto the impeller and causes it to revolve which imparts motion to the striker and actuates the clapper so it hits the bell to make signal sounds continuously while the liquid is flowing. When the liquid level reaches a predetermined high line the liquid will partly or wholly cover the impeller and temporarily prevent further revolving thereof thus stopping the signal or making the sounds ineffective and thereby indicating the liquid level within the tank so the operator may discontinue the filling operations.

The type of signal illustrated in Figs. 9 and 10 is somewhat similar to that shown in Figs. 2, 3 and 4 and comprises the support 31a including the bearing portion 30a and the legs 32a supported by the fill line or the nipple 25 thereof, in particular. Said bearing portion has a recess or socket 30b in its upper end to receive and partially house the striker check 28b which may be a sleeve or enlargement on the rod 28a, said sleeve or enlargement having a tapered upper end 28c. The rod and the striker check are slidably and rotatably mounted in the bearing portion of the support 31a and said rod 28a preferably includes an upper section 28d and a lower section 28e fastened together with the float 29a attached to said lower section.

An operated member or jointed striker 27a is revolvably mounted on the rod 28a, and more particularly on the upper section 28d and the striker check 28b, which striker 27a includes the bifurcated bracket 27b, which is the part of the striker that is journalled on the rod. The lower leg of the bifurcated bracket is offset or upset at its end, as indicated at 27c so that the offset is in approximately the same plane as the upper end of the striker check. This construction provides a wide space between the main portions of the bracket legs and a narrow space between them at the ends. In addition to the bracket 27b, the striker includes the swinging hammer 27d pivoted at 27e within the narrower space between the legs of the bifurcated bracket whereby said hammer is normally above the striker check, especially when said check is in a lowered or neutral position.

An operating member or impeller 26a is fixedly connected with the operated member or striker and revolves about the rod 28a with the operated member or striker. In actual practice said impeller may be fixed directly to the bifurcated bracket. The rod 28a has a head 40a that may engage the hub of the impeller to limit the downward movement of the float and component parts of said rod and also prevent the impeller and striker from being displaced or disengaged from said rod.

It might be well to state that the striker is supported by the bearing portion of the support 31a and a washer 31b may be interposed between said support and striker.

Like in the form of the device first described there is a lug 37a carried directly by the fill line and especially the nipple 25 thereof and in the path of travel of the striker when the hammer portion is projected.

The distance between the center of the pivot 27c and a side of the hammer portion 27d of the striker or operated member 27a is less than the distance between said pivot and the back or rear end of said hammer portion 27d so that the tapered end of the striker check can be moved upwardly along side of the hammer portion, due to elevation of the float, and prevent said hammer portion from being swung or projected outwardly. Because of the longer rear end of the hammer portion said striker check cannot be moved upwardly behind said hammer portion which might hold the latter in an extended or projected position.

In operation, the float is normally in a lowered position and the striker check is below the hammer portion of the striker. As liquid flows through the fill line said liquid will actuate the operating member or impeller and cause the operated member or striker to revolve which will project the hammer portion outward, due to centrifugal force so it may hit the lug and produce signal sounds continuously, as long as the liquid flows. As the level of the liquid reaches the float and continues to rise said float will be raised and lift the striker check until the tapered end of said check is moved up along side of the hammer portion of the striker back of the pivot, at a time when said hammer portion is retracted, and will thereby retain the striker in the ineffective position but the striker and impeller will continue to revolve. This will eliminate any possible impediment to the continuous free flow of the liquid. Since the striker is prevented from hitting the lug after the check is moved into contact with one side of the hammer portion, the signal sounds will cease and the liquid level in the tank is indicated even though said tank is of the closed type and no part of the signal is visible.

From the foregoing it is apparent that in every form or type of the signal the highly important features are, that the signal device is positioned in the line of liquid flow to be operated by the flowing liquid; that sound is produced by a striker hitting some part of a resonant object; and that the liquid level is indicated by temporarily stopping the striker or making the same ineffective.

Of course I do not wish to be limited to the exact details of construction herein shown and described as these may be varied within the scope of the appended claims without departing from the spirit of the invention.

Having described my invention what I claim as new and useful is:

1. In combination with a tank having a filling opening, a sound producing device positioned in series with said opening and operable by liquid flowing through said opening, and means actuated by the moving liquid level in said tank for rendering said device operative or inoperative.

2. In a device of the kind described, a tank having a filling opening, a liquid operated signal in the line of liquid flow through said opening and including an operating member, an operated member continuously driven by said operating member during operation of the latter, and resonant means coacting with the operated member to produce sounds.

3. In a device of the kind described, a tank, fill and vent lines leading to and from said tank with the inlet end of said fill line remote from the tank, a sound making instrumentality connected with said fill line and operated by liquid flowing therethrough, the sounds produced being transmitted along said fill line by vibrations therein or passing through either or both said fill and vent lines, and means controlled by the moving liquid level in the tank to render the sound making instrumentality audible or inaudible.

4. In a device of the kind described, in combination, a tank, a fill-vent box, a vent line leading from the tank to said box and open to atmosphere, a fill line having its inlet end in said box and leading to the tank, a liquid operated sound making instrumentality connected with said fill line and in the path of liquid flow, the sounds produced being transmitted along said fill line or passing through either the fill or vent lines to said box, and means controlled by the moving liquid level in the tank to render the sound making instrumentality effective or ineffective.

5. In combination with a tank having filling opening, a metal pipe element connected to said tank in said filling opening, a lug carried by the pipe element, an impeller mounted in said pipe element and propelled by liquid flowing through the pipe towards the tank, a jointed striker carried by a portion of the impeller and projected by centrifugal force to strike the lug for causing sound vibrations which progress through the body of the pipe, and means actuated by the liquid level in the tank to make the striker operative or inoperative.

6. A signal for use in a tank having a filling opening through which liquid flows, a sound producing device located in series with the flow of said liquid and adapted to be operated by said liquid flowing through said opening to the tank, and means actuated by a rising liquid level to render said sound producing device inoperative.

THEODORE C. SMITH.

REFERENCES CITED

The following references are of record in the file of this patent:

UNITED STATES PATENTS

| Number | Name | Date |
| --- | --- | --- |
| 238,653 | Conlon | Mar. 8, 1881 |
| 2,069,779 | Rudolf et al. | Feb. 9, 1937 |
| 2,107,952 | McGee | Feb. 8, 1938 |
| 2,233,229 | Tapp | Feb. 25, 1941 |
| 2,309,804 | Smith | Feb. 2, 1943 |
| 2,411,872 | Di Renzo | May 18, 1948 |